United States Patent
Kawamura et al.

(10) Patent No.: US 8,545,925 B2
(45) Date of Patent: Oct. 1, 2013

(54) CANDY COMPOSITION WITH EXCELLENT SWEETNESS AND CANDY USING THE SAME

(75) Inventors: Satomi Kawamura, Hyogo (JP); Hiroshi Segawa, Hyogo (JP); Toshihiro Hamada, Okayama (JP)

(73) Assignee: Sensei Foods Co., Ltd., Himeji-Shi, Hyogo (JP)

( * ) Notice: Subject to any disclaimer, the term of this patent is extended or adjusted under 35 U.S.C. 154(b) by 776 days.

(21) Appl. No.: 11/921,815

(22) PCT Filed: May 8, 2006

(86) PCT No.: PCT/JP2006/309611
§ 371 (c)(1),
(2), (4) Date: Dec. 7, 2007

(87) PCT Pub. No.: WO2006/132057
PCT Pub. Date: Dec. 14, 2006

(65) Prior Publication Data
US 2009/0148568 A1    Jun. 11, 2009

(30) Foreign Application Priority Data

Jun. 8, 2005    (JP) ................................ 2005-168729

(51) Int. Cl.
*A23G 3/34*    (2006.01)
*A23G 3/38*    (2006.01)
*A23L 1/22*    (2006.01)
*A23G 3/42*    (2006.01)

(52) U.S. Cl.
CPC .... *A23G 3/38* (2013.01); *A23G 3/42* (2013.01)
USPC ......................................... 426/660; 426/89

(58) Field of Classification Search
CPC . A23V 2002/00; A23V 2250/24; A23G 3/52; A23G 3/72; A23G 3/38; A23G 3/36; A23L 1/097; A23L 1/2366; A23L 1/236; A23L 1/2367
USPC ............................................ 426/660, 49, 89
See application file for complete search history.

(56) References Cited

U.S. PATENT DOCUMENTS

| 3,409,441 A | 11/1968 | Bouchard et al. |
| 3,875,307 A * | 4/1975 | Wolt et al. ...................... 426/533 |
| 2007/0148103 A1* | 6/2007 | Harvey ............................ 424/48 |

FOREIGN PATENT DOCUMENTS

| GB | 1 468 127 A | 3/1977 |
| JP | 50-140659 A | 11/1975 |

(Continued)

OTHER PUBLICATIONS

Maltol downloaded from the internet at: http://www.thegoodscentscompany.com/data/rw1002341.html.*

(Continued)

*Primary Examiner* — Donald Tarazano
*Assistant Examiner* — Jerry W Anderson
(74) *Attorney, Agent, or Firm* — Preti Flaherty Beliveau & Pachios LLP

(57) ABSTRACT

It is an object of the invention is to provide a candy composition in which a sugar alcohol is used as a main raw material and which is comparable in intensity of sweetness and quality of sweetness to sugar as well as a candy manufactured using the same.

The above object can be accomplished by providing a deliciously sweet candy composition which comprises sugar alcohol as a main raw material and comprises high sweetness intensity sweetener (E), flavoring components (A) maltol and (B) furaneol as essential components, each in an effective amount, and an effective amount of at least one component selected from among flavoring components (C) cyclotene and (D) menthyl acetate.

15 Claims, 2 Drawing Sheets

(56) References Cited

FOREIGN PATENT DOCUMENTS

| | | |
|---|---|---|
| JP | 2-276553 | 11/1990 |
| JP | 7-67536 A | 3/1995 |
| JP | 8-228688 A | 9/1996 |
| JP | 9-75005 A | 3/1997 |
| JP | 10-313819 A | 12/1998 |
| JP | 2933975 B2 | 5/1999 |
| JP | 2003079336 | 3/2003 |
| JP | 3111014 | 7/2005 |

OTHER PUBLICATIONS

Cyclotene downloaded from the internet at: http://www.thegoodscentscompany.com/data/rw1012711.html.*

Furaneol downloaded from the internet at: http://www.thegoodscentscompany.com/data/rw1000931.html.*

* cited by examiner

CANDY COMPOSITION WITH EXCELLENT SWEETNESS AND CANDY USING THE SAME

This application is a §371 national phase filing of PCT/JP2006/309611 filed May 8, 2006, and claims priority to Japanese application No. 2005-168729 filed Jun. 8, 2005.

TECHNICAL FIELD

The present invention relates to a candy composition having a delicious sweet taste and to a candy comprising the same. More particularly, it relates to a candy composition which is based on sugar alcohol and improved in intensity of sweetness and quality of sweetness so as to be comparable to sugar and to a candy comprising such candy composition.

BACKGROUND ART

Conventionally, candies are manufactured by incorporating a fruit juice(s), a favoring(s) and a sour agent(s), among others, in a main material composition having a sweet taste, comprising sugar, thick malt syrup (syrup produced by converting starch to sugars) and/or the like, heating and blending the resulting mixture, cutting and stamping the soft or plastic compound, followed by cooling (stamping method) or by casting the compound in a molten state into molds and, after cooling and solidification, releasing candies from the molds (casting method).

In addition to such sugar and starch syrup (thick malt syrup) used as main raw materials of candies, sugar alcohols have become preferred as sugarless materials from a viewpoint of preventing dental caries and/or diabetes. Sugar alcohols are lower in calorific value than sugar, so persons interested in dieting also prefer them.

As for the sugar alcohols, reduced starch syrup, reduced malt sugar syrup, reduced maltose (maltitol), xylitol, erythritol and reduced palatinose, for example, are abundantly used as main raw materials for candies.

While xylitol is as sweet as sugar, reduced starch syrup, reduced malt sugar syrup, reduced maltose (maltitol), erythritol and reduced palatinose, among others, are lower in intensity of sweetness than sugar and different in quality of sweetness from sugar.

As a result, sugarless candies made by using sugar alcohols taste more watery or weaker than sugar-based candies.

Therefore, for the purposes of supplementing the insufficient intensity of sweetness and improving the quality of sweetness of reduced starch syrup, reduced malt sugar syrup, reduced maltose (maltitol) and like sugar alcohols, investigations and proposals have been made concerning the incorporation of various flavor components. The term "intensity of sweetness" as used herein means the degree or extent of sweetness, while the "quality of sweetness" refers to the quality or characteristic of sweetness. As described later herein, both the features each can be specifically evaluated in a sensory test. The intensity of sweetness, for instance, is relatively evaluated with the intensity of sugar being taken as 100. The quality of sweetness is the qualitative feel deeply associated with a flavor and/or taste and also can be evaluated in a sensory test. The desired goals are the same level of intensity of sweetness as that of sugar and the sugar-like natural quality of sweetness.

Thus, for example, known in the art are a sweetness-enhancing method comprising using maltol to thereby reduce the proportion of sugar (cf. Patent Document 1), a sweetness-enhancing method comprising using furaneol to thereby reduce the proportion of sugar (cf. Patent Document 2), a taste-improving method comprising using aspartame in combination with one or more species selected from among maltol, sotolone, vanillin, cyclotene and furfural to provide aspartame with a sweet, deep and mild taste (cf. Patent Document 3), a method of enhancing the sweetness of foods and drinks by adding one or both of cyclotene and sotolone (cf. Patent Document 4), a flavor-improving composition comprising sotolone or 5-ethyl-3-hydroxy-4-methyl-2(5H)-furanone and one or more species selected from among dimethyl sulfide, methanethiol, hydrogen sulfide, dimethyl disulfide and dimethyl trisulfide and soups and other foods comprising the same (cf. Patent Document 5), and foods comprising (a) a sweetener high in intensity of sweetness, for example aspartame, and (b) a p-menthane skeleton-containing derivative (e.g. menthyl acetate), wherein the content level of the component (b) is not higher than the threshold thereof (cf. Patent Document 6).

[Patent Document 1] U.S. Pat. No. 3,409,441
[Patent Document 2] Japanese Patent Publication No. S50 (1975)-140659
[Patent Document 3] Japanese Patent Publication No. H02 (1990)-276553
[Patent Document 4] Japanese Patent No. 2933975
[Patent Document 5] Japanese Patent Publication No. 2003-79336
[Patent Document 6] Japanese Patent Publication No. H10 (1998)-313819

DISCLOSURE OF INVENTION

Problems which the Invention is to Solve

However, sugar alcohols are lower in intensity of sweetness than sugar and their quality of sweetness is not a natural one and, thus, in preparing candy compositions comprising sugar alcohol as main raw materials, two problems, namely the intensity of sweetness and quality of sweetness problems are encountered. For improving the intensity of sweetness, various sweeteners high in intensity of sweetness are used in combination with sugar alcohols. However, sweeteners high in intensity of sweetness respectively have a characteristic taste or flavor and, therefore, they are difficult to provide such a natural quality of sweetness as that of sugar. Further, for providing a level of intensity of sweetness which is comparable to that of sugar, it is necessary to incorporate the sweetener in large amounts and, when the amount of the sweetener is large, there arises the problem that the bitterish sweetness characteristic of the sweetener high in intensity of sweetness and/or the flavor of the synthetic material usually becomes significant.

In addition, among sugar alcohols, reduced palatinose is fairly lower in intensity of sweetness and when a sweetener high in intensity of sweetness is used to compensate for the shortage of intensity of sweetness of reduced palatinose, the candies obtained cannot have a natural sweet taste, like in the case of other sugar alcohols; thus, there is the problem that the candies will never be equal in taste to the conventional sugar-based candies.

Further, reduced palatinose is highly crystalline, hence not so highly hygroscopic as reduced starch syrup or reduced malt sugar syrup, and is advantageous in that it will not become sticky even when left in a humid room. However, no investigations have so far been made concerning reduced palatinose-based candy compositions improved in intensity of sweetness and quality of sweetness so as to make them comparable to sugar.

Accordingly, it is a first object of the invention to provide a sugarless candy composition in which sugar alcohol is used as a main component and which can solve the prior art watery or weak taste problem and which has a natural sweet taste comparable in taste to the conventional sugar-based candies and thus has a delicious sweet taste.

A second object of the invention is to provide a candy comprising such candy composition and improved in intensity of sweetness and quality of sweetness so as to be comparable to sugar or sucrose.

Means for Solving the Problems

In a first aspect, the present invention which is to accomplish the above objects provides a candy composition having a delicious sweet taste and characterized in that it comprises sugar alcohol as a main raw material and further comprises sweetener component (E) high in intensity of sweetness and the flavoring components (A) and (B) specified below as essential components, each in an effective amount, and an effective amount of at least one component selected from among the flavoring components (C) and (D) defined below:
(A) maltol;
(B) furaneol;
(C) cyclotene;
(D) menthyl acetate.

In a second aspect of the invention, the candy composition according to the first aspect of the invention is characterized in that it comprises the sugar alcohol as a main raw material and comprises the sweetener component (E) high in intensity of sweetness in an amount of 0.05-0.5% by mass based on the whole candy composition and the flavoring components (A) and (B) and at least one of the flavoring components (C) and (D) in a total proportion [(A)+(B)+(C)+(D)] of 0.0005-0.01% by mass based on the whole candy composition, wherein the mass ratio (A)/(B) is within the range specified below by the formula (1) and the mass ratio (A)/[(B)+(C)+(D)] is within the range specified below by the formula (2):

$(A)/(B)=0.50-3$      Formula (1);

$(A)/[(B)+(C)+(D)]=0.25-2$      Formula (2).

In a third aspect of the invention, the candy composition according to the first or second aspect of the invention is characterized in that the sweetener component (E) high in intensity of sweetness comprises at least one sweetener selected from among acesulfam K, stevia and sucralose.

In a fourth aspect of the invention, the candy composition according to any of the first to third aspects of the invention is characterized in that the sugar alcohol substantially comprises reduced palatinose.

In a fifth aspect, the invention provides a candy characterized in that it comprises the candy composition according to any of the first to fourth aspects of the invention.

In a sixth aspect, the invention provides a candy characterized in that it has a composite structure resulting from combination of two or more different candy compositions each according to any of the first to fourth aspect of the invention.

In a seventh aspect, the invention provides a candy characterized in that it has a composite structure resulting from combination of a xylitol-containing layer containing xylitol as a main raw material but containing none of the components (A) to (E) defined above and a candy composition according to any of the first to fourth aspects of the invention.

In an eighth aspect, the invention provides a stacked candy characterized in that it has a three-layer structure comprising a xylitol-containing layer containing xylitol as a main raw material but containing none of the components (A) to (E) defined above and two candy composition layers formed of two respective candy compositions according to any of the first to fourth aspects of the invention, which may be same or different in composition, the xylitol-containing layer being sandwiched between the two candy composition layers.

Effects of the Invention

The candy composition according to the first aspect of the invention which has a delicious sweet taste comprises sugar alcohol as main raw material as well as sweetener component (E) high in intensity of sweetness, the above-mentioned flavoring components (A) and (B) as essential components, each in an effective amount, and an effective amount of at least one component selected from among the above-mentioned flavoring components (C) and (D), so that even though it is a base for sugarless candies, it can solve the prior art watery or weak taste problem and produce remarkable effects, namely it can give candies having a natural sweet taste and comparable in taste to the conventional sugar-based candies.

The candy composition according to the second aspect of the invention which has a delicious sweet taste is a candy composition according to the first aspect of the invention which comprises the sugar alcohol as a main raw material and comprises the sweetener component (E) high in intensity of sweetness in an amount of 0.05-0.5% by mass relative to the whole candy composition and the above-mentioned flavoring components (A) and (B) and at least one of the above-mentioned flavoring components (C) and (D) in a total proportion [(A)+(B)+(C)+(D)] of 0.0005-0.01% by mass relative to the whole candy composition, with the mass ratios (A)/(B) and (A)/[(B)+(C)+(D)] being within the respective ranges specified above, and produces a further significant effect, namely the intensity of sweetness and quality of sweetness thereof can be definitely improved to the sugar level.

The candy composition according to the third aspect of the invention is a candy composition according to the first or second aspect of the invention in which the sweetener component (E) high in intensity of sweetness comprises at least one sweetener selected from among acesulfam K, stevia and sucralose and, by the use of acesulfam K, stevia and/or sucralose selected from among such generally known sweeteners high in intensity of sweetness as acesulfam K, stevia, sucralose, aspartame, saccharin, glycyrrhizin and derivatives thereof, which are all applicable in the practice of the invention, the composition can produce a further significant effect, namely the intensity of sweetness and quality of sweetness thereof can be definitely improved to the sugar level.

The candy composition according to the fourth aspect of the invention is a candy composition which has a delicious sweet taste according to any of the first to third aspects of the invention in which the sugar alcohol substantially comprises reduced palatinose, and the composition can produce a further significant effect, namely the intensity of sweetness and quality of sweetness thereof can be definitely improved to the sugar level even when reduced palatinose is used as a main raw material while overcoming the prior art problems that reduced palatinose is low in intensity of sweetness and attempts to compensate for the shortage of intensity of sweetness of reduced palatinose by incorporating a sweetener high in intensity of sweetness result in failure to provide a natural sweet taste, hence the resulting compositions are inferior in taste to sugar candies.

The use of reduced palatinose, which is highly crystalline, hence not so highly hygroscopic as reduced starch syrup or reduced malt sugar syrup, is further advantageous in that it will not become sticky even when left in a humid room.

Furthermore, the use of reduced palatinose is advantageous in that it is not so expensive as reduced maltose (maltitol) or xylitol, namely inexpensive, hence can be readily used on a commercial scale.

The candy according to the fifth aspect of the invention is characterized in that it comprises the candy composition according to any of the first to fourth aspects of the invention; it produces marked effects: namely, it can provide the same levels of intensity of sweetness and quality of sweetness as those of sugar, hence tastes delicious.

The candy according to the sixth aspect of the invention is characterized in that it has a composite structure resulting from combination of two or more candy compositions different in composition but each in accordance with any of the first to fourth aspects of the invention; it produces marked effects: it can be tasted in two or more different ways owing to the differences in composition, namely the differences in intensity of sweetness and quality of sweetness, hence is delicious.

The candy according to the seventh aspect of the invention is characterized in that it has a composite structure resulting from combination of a xylitol-containing layer containing xylitol as a main component but containing none of the components (A) to (E) defined above and candy composition according to any of the first to fourth aspects of the invention; when sucked in the oral cavity, it produces marked effects: it produces a remarkable cooling effect owing to the endothermic action produced upon dissolution of the xylitol-containing layer and, at the same time, can give the good taste of the stacked candy composition layer, hence tastes delicious.

The stacked candy according to the eighth aspect of the invention is characterized in that it has a three layer structure comprising a xylitol-containing layer containing xylitol as a main component but containing none of the components (A) to (E) defined above as sandwiched between two candy composition layers which may be the same or different and each is in accordance with any of the first to fourth aspects of the invention. When sucked in the oral cavity, it produces marked effects: it produces a remarkable cooling effect owing to the endothermic action produced upon dissolution of the xylitol-containing layer and, at the same time, can give the good tastes of the stacked candy composition layers simultaneously or tastes deliciously in different manners with the lapse of time, for example different texture feels are given at the beginning of sucking and toward the end thereof, hence tastes delicious and is of high commercial value.

Figure 1:
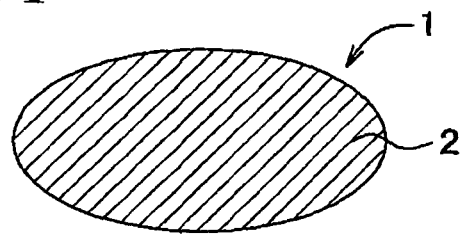
FIG. 1 is an explanatory drawing schematically illustrating, in section, an example of a candy of the invention which has a delicious sweet taste.

| EXPLANATION OF SYMBOLS In FIGS. 1 to 7, the symbols have the following respective meanings: | |
|---|---|
| 1 | Candy |
| 2 | Candy composition |
| 1A | Candy having a two-layer structure |
| 1B | Stacked candy having a three-layer structure |
| 1C, 1D, 1E, 1F | Candy having a composite structure |
| 2A | Candy composition layer |
| 2B, 2C, 2D | Candy section |
| 3A | Xylitol-containing layer |
| 3B, 3C | Xylitol section |

BEST MODES FOR CARRYING OUT THE INVENTION

Referring to the drawings, typical modes of embodiment of the present invention are now described in detail.

FIG. 1 is an explanatory drawing schematically illustrating, in section, an example of a candy of the invention which has a delicious sweet taste.

In FIG. 1, the reference number 1 stands for a candy formed exclusively of a candy composition according to the invention which has a delicious sweet taste.

The candy 1 according to the invention which has a delicious sweet taste is a delicious candy improved in intensity of sweetness and quality of sweetness to the sugar level. It is produced, for example, by melting and mixing, at about 160° C., a candy composition 2 according to the invention which comprises reduced palatinose, reduced malt sugar syrup and/or a like sugar alcohol as a main raw material with a sweetener component (E) high in intensity of sweetness and the above-mentioned flavoring components (A), (B), (C) and (D) each in an effective amount as incorporated therein, and depositing the melt into a mold, followed by cooling for solidification.

Figure 2:
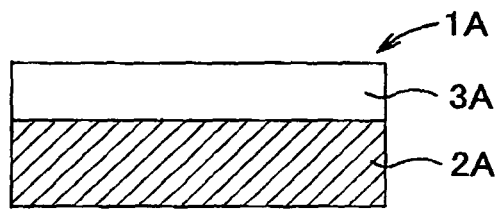
FIG. 2 is an explanatory drawing schematically illustrating, in section, an example of a candy of the invention which has a two-layer structure.

FIG. 2 is an explanatory drawing schematically illustrating, in section, an example of a candy of the invention which has a two-layer structure.

In FIG. 2, 1A indicates a two-layer stacked candy (also referred to as candy having a composite structure) according to the invention, 2A denotes a candy composition layers formed of a candy composition 2 and 3A denotes a xylitol-containing layer containing xylitol as a main component but containing none of the above-defined components (A) to (E). It is produced, for example, by preparing the respective compositions by melting and mixing and then depositing the melts successively in a mold, followed by cooling for solidification.

The stacked candy 1A according to the invention, when sucked in the oral cavity, produces a remarkable cooling effect owing to the endothermic action produced upon dissolution of the xylitol-containing layer 3A and, at the same time, can give the good sweet taste of the stacked candy composition layer 2A, hence tastes delicious.

Figure 3:
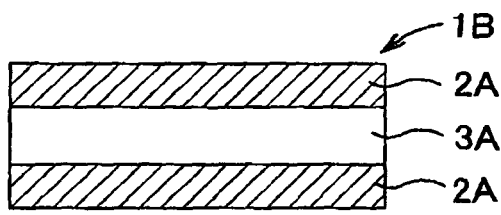
FIG. 3 is an explanatory drawing schematically illustrating, in section, an example of a stacked candy of the invention which has a three-layer structure.

FIG. 3 is an explanatory drawing schematically illustrating, in section, an example of a stacked candy of the invention which has a three-layer structure.

In FIG. 3, the same symbols as used in FIG. 1 and FIG. 2 indicate the same constituent members, respectively; hence the explanation thereof is omitted.

In FIG. 3, 1B stands for a stacked candy according to the invention which has a three-layer structure, with the xylitol-containing layer 3A being sandwiched between the corresponding two deliciously sweet candy layers 2A.

The three-layer-structured stacked candy 1B according to the invention, when sucked in the oral cavity, produces a remarkable cooling effect owing to the endothermic action produced upon dissolution of the xylitol-containing layer 3A and, at the same time, can give the good sweet taste of the stacked candy composition layers 2A simultaneously or give differently delicious tastes with the lapse of time, for example different texture feels are given at the beginning of sucking and toward the end thereof, hence tastes delicious and is of high commercial value.

Figure 4:
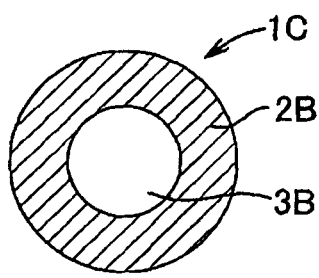
FIG. 4 is an explanatory drawing schematically illustrating, in section, an example of a candy of the invention which has a composite structure.

FIG. 4 is an explanatory drawing schematically illustrating, in section, an example of a candy of the invention which has a composite structure.

In FIG. 4, 1C stands for a composite-structured candy according to the invention, 3B indicates a spherical xylitol-based section formed by using a xylitol-based composition containing xylitol as a main component but containing none of the above-mentioned components (A) to (E), and 2B indicates a candy moiety having a delicious sweet taste as formed using a candy composition 2 according to the invention so as to totally coat or cover the spherical xylitol section 3B.

Figure 5:
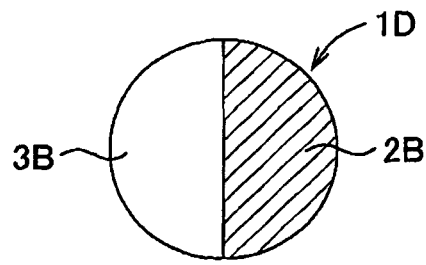
FIG. 5 is an explanatory drawing schematically illustrating, in section, another example of the candy of the invention which has a composite structure.

FIG. 5 is an explanatory drawing schematically illustrating, in section, another example of the candy of the invention which has a composite structure.

In FIG. 5, 1D stands for a composite-structured candy according to the invention, 3B indicates a semispherical xylitol-based section formed by using a composition containing xylitol as a main component but containing none of the above components (A) to (E), and 2B indicates a semispherical candy section formed by using a candy composition 2 according to the invention with the plane face thereof being joined to that of the semispherical xylitol-based section 3B.

Figure 6:
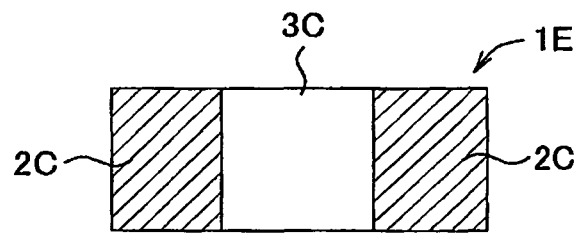
FIG. 6 is an explanatory drawing schematically illustrating, in section, still another example of the candy of the invention which has a composite structure.

FIG. 6 is an explanatory drawing schematically illustrating, in section, still another example of the candy of the invention which has a composite structure.

In FIG. 6, 1E stands for a composite-structured candy according to the invention, 3C indicates a xylitol section cylindrically formed using a xylitol-based composition containing none of the above-mentioned components (A) to (E) and 2C indicates a candy section having a delicious sweet taste as formed using a candy composition 2 according to the invention so as to cover or surround the lateral surface of the cylindrical xylitol section 3C.

Figure 7:
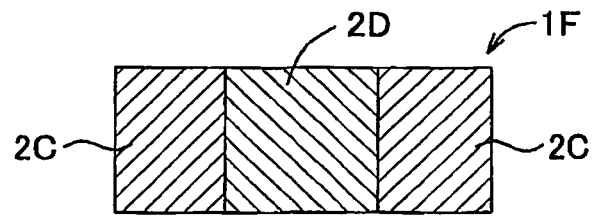
FIG. 7 is an explanatory drawing schematically illustrating, in section, still another example of the candy of the invention which has a composite structure.

FIG. 7 is an explanatory drawing schematically illustrating, in section, still another example of the candy of the invention which has a composite structure.

In FIG. 7, 1F stands for a composite-structured candy according to the invention, 2D indicates a candy section cylindrically shaped using a candy composition 2 according to the invention, and 2C indicates a candy section having a delicious sweet taste as formed using a candy composition according to the invention which differs from the candy composition 2 forming the section 2D so as to cover or surround the lateral surface of the candy section 2D.

Such sugar alcohols as reduced palatinose and reduced malt sugar syrup are saccharides lower in calorific value than sugar and are therefore preferred by those interested in dieting, among others. While, among them, reduced palatinose has a high level of crystallinity and has good performance characteristics for use as a candy raw material, these saccharides are inferior in intensity of sweetness and quality of sweetness to sugar. Incorporation of conventional sweetener components (E) high in intensity of sweetness in such saccharides results in increases in intensity of sweetness but cannot provide that natural sweetness of sugar.

The present invention has been made based on the findings that when a sweetener component (E) high in intensity of sweetness and, further, an effective amount of each of the above-mentioned flavoring components (A) and (B) as essential components and an effective amount of at least one component selected from among the above-mentioned flavoring components (C) and (D) are incorporated in sugar alcohols, the prior art problem that sugarless candies based on sugar alcohols such as reduced palatinose and reduced malt sugar syrup become watery or weak in taste can be solved and delicious candies improved in intensity of sweetness and quality of sweetness to the levels of sugar by the synergistic effect of the respective components can be obtained.

The sugar alcohols to be used in the practice of the invention are sugar alcohols differing in intensity of sweetness and quality of sweetness from sugar, such as reduced starch syrup, reduced malt sugar syrup, reduced maltose (maltitol), xylitol, erythritol and reduced palatinose.

Among these sugar alcohols, xylitol is close in quality of sweetness to sugar, so that the intensity of sweetness thereof can be improved to the sugar level by incorporating a sweetener component (E) high in intensity of sweetness in a minimal necessary proportion with or without incorporation of small proportions of the aforesaid flavoring components (A) to (D).

In the case of reduced malt sugar syrup, which is relatively high in intensity of sweetness but has a characteristic quality of sweetness, or in the case of reduced palatinose, which is low in intensity of sweetness and also characteristic in quality of sweetness, the intensity of sweetness and quality of sweetness thereof can be improved to the sugar level by incorporating therein a sweetener component (E) high in intensity of sweetness as well as an effective amount each of the flavoring components (A) and (B) as essential components and an effective amount of at least one component selected from among the flavoring components (C) and (D).

The component (A), namely maltol, to be used according to the invention is a synthetic flavoring component having a caramel odor and can also be isolated from pine needles and chicories.

The component (B) furaneol to be used in according to the invention is an isomer of maltol and also called isomaltol and exists in strawberries and pineapples and is available as a synthetic flavoring component reminding of the sweetness of strawberry jam.

The component (C) cyclotene to be used according to the invention is contained in barley tea and is available as a synthetic flavoring component reminding of the warm sweetness of maple syrup, among others.

The component (D) menthyl acetate to be used according to the invention is found in peppermint oil and is available as a synthetic flavoring component having a sweet smell and a refreshing flavor.

The sweetener component (E) high in intensity of sweetness, which is to be used in the practice of the invention, includes acesulfam K, stevia, sucralose, aspartame, saccharin, glycyrrhizin and derivatives thereof. While all of these are applicable in the practice of the invention, acesulfam K, stevia and sucralose can be preferably used since the use thereof can reliably improve the intensity of sweetness and quality of sweetness to the level of sugar.

In the practice of the invention, two or more of these sweetener components high in intensity of sweetness are preferably used in combination since the combined use results in greater improvements in intensity of sweetness and quality of sweetness, although they may of course be used singly.

In the practice of the invention, the sugar alcohol mentioned above is used as the main raw material and the sweetener component (E) high in intensity of sweetness is incorporated therein preferably in an amount of 0.05-0.5% by mass relative to the whole candy composition, and the flavoring components (A) and (B) and at least one component selected from among the flavoring components (C) and (D) are incorporated in a total amount [(A)+(B)+(C)+(D)] of 0.0005-0.01% by mass relative to the whole candy composition on condition that the mass ratios (A)/(B) and (A)/[(B)+(C)+(D)] should be within the ranges specified above by the formulas (1) and (2), respectively.

Even when the sugar alcohol species and/or the proportions thereof, among others, are varied, the above-specified ranges can reliably lead to candy compositions having a natural sweetness and having a taste more comparable to the taste of conventional sugar-based candies.

In the case of reduced malt sugar syrup, which has a characteristic quality of sweetness, or in the case of reduced palatinose, which is low in intensity of sweetness and also is characteristic in quality of sweetness, the flavoring components mentioned above are more preferably incorporated therein in a total amount [(A)+(B)+(C)+(D)] within the range of 0.0005-0.01% by mass relative to the whole candy composition on condition that the mass ratio range conditions specified by the formulas (1) and (2) given above should be satisfied; the flavoring component (D) is incorporated therein according to need in a proportion and a mass ratio range satisfying the formulas given above.

The sweetener component (E) high in intensity of sweetness is incorporated preferably in a proportion of 0.05-0.5% by mass, more preferably 0.05-0.3% by mass, relative to the whole candy composition. At levels lower than 0.05% by mass, the intensity of sweetness may possibly become insufficient as compared with sugar and, at levels exceeding 0.5% by mass, the quality of sweetness may possibly be impaired.

The mass ratio (A)/(B) represented by the formula (1) is preferably 0.50-3, more preferably 0.50-2. When the ratio is below 0.50, the intensity of sweetness and quality of sweetness may possibly be inferior and, when it is in excess of 3, the quality of sweetness, in particular, may possibly be impaired.

The mass ratio (A)/[(B)+(C)+(D)] represented by the formula (2) is preferably 0.25-2, more preferably 0.25-1.5. When the ratio is below 0.25, the quality of sweetness may possibly be inferior and, when it is in excess of 2, the intensity of sweetness and quality of sweetness may possibly be impaired.

The components [(A)+(B)+(C)+(D)] are incorporated preferably in a total amount of 0.0005-0.01% by mass, more preferably 0.001-0.01% by mass, relative to the whole candy composition. At levels lower than 0.0005% by mass, the quality of sweetness may possibly be inferior and, at levels exceeding 0.01% by mass, the quality of sweetness may possibly be impaired as well.

In the practice of the invention, one or more of such flavoring components as furfuryl alcohol, acetoin, acetol, acetylfuran, sotolone, α-angelica lactone, vanillin and ethylvanillin may further be used for further improvements in intensity of sweetness and quality of sweetness.

Further, in the practice of the invention, one or more of flavoring components giving a feeling of coolness, such as menthol and eucalyptol, fruit aromas providing a flavor, fruit juices, extracts, fats or oils, emulsifiers, and food dyes to be used for coloration may also be used.

Candies can be manufactured by using only one deliciously sweet candy composition according to the invention, melting the same by heating and pouring the composition in molten state into molds, followed by cooling for solidification and releasing from the molds.

Further, candies having a composite structure comprising two or more candy composition layers differing in composition or candies having a composite structure comprising two or more candy sections differing in composition can also be manufactured by using two or more candy compositions according to the invention, which are different in composition and have a delicious sweet taste, melting them by heating and pouring the compositions in molten state successively into molds, followed by cooling for solidification and releasing from the molds. They are candies having a plurality of regions each of which is formed of a deliciously sweet candy composition according to the invention but which are formed of candy compositions differing in the kinds and levels of incorporation of the sugar alcohol, sweetener component (E) high in intensity of sweetness, flavoring components (A), (B), (C) and (D) and other components contained therein.

It is also possible to manufacture candies having a composite structure resulting from combination of a xylitol-containing layer formed of a composition containing xylitol as a main component but containing none of the components (A) to (E) and a candy composition layer formed of a deliciously sweet candy composition according to the invention.

It is also possible to manufacture candies having a composite structure resulting from stacking of a xylitol-containing layer formed of a composition containing xylitol as a main component but containing none of the components (A) to (E) and a candy composition layer formed of a deliciously sweet candy composition according to the invention.

It is further possible to manufacture stacked candies having a three-layer structure constituted of a xylitol-containing layer containing xylitol as a main component but containing none of the components (A) to (E) and two candy composition layers formed of respective deliciously sweet candy compositions according to the invention, which may be the same or different in composition, with the xylitol-containing layer being sandwiched between the latter two layers.

Thus, the candies mentioned above are candies constituted of a plurality of regions or sections, at least one of which is a region formed of a candy composition according to the invention and at least another one of which is a region formed of a composition the main component of which is xylitol. The xylitol region is substantially free of the sweetener component (E) high in intensity of sweetness and of the flavoring components (A), (B), (C) and (D). The specific structures of candies having such a composite structure are as described above and are as shown in FIGS. 2 to 7.

EXAMPLES

The following examples and comparative examples illustrate the invention more specifically. Those examples are, however, by no means limitative of the scope of the invention.

Example 1

According to the formulation (the amount of each component or ingredient being given in terms of part(s) by mass) given in Table 1, malic acid, a high sweetness intensity sweetener (acesulfam K; trade name Sunett), a high sweetness intensity sweetener (sucralose; trade name Sunsweet), a flavoring agent (apple flavor), a red colorant (purple corn color; trade name Sanred No. 5) and 1% (by mass) solutions of the respective flavoring components (A), (B), (C) and (D) in a glycerol fatty acid ester were incorporated into reduced palatinose, the resulting mixture was melted and mixed up at 160° C. and the melt was deposited into molds and then cooled for solidification. Test candies were thus prepared.

These test candies were subjected to taste testing by 10 monitors (5 males and 5 females; aged 25-40 years) for evaluation of the intensity of sweetness and quality of sweetness. The evaluation results are also shown in Table 1.

The numerical values for the intensity of sweetness and quality of sweetness as given in Table 1 are respectively the number of persons, among the monitors, who felt that the intensity of sweetness was insufficient and the number of persons who felt that the quality of sweetness was unsatisfactory. Thus, the number 0 or a number as small as possible indicates that the intensity of sweetness or quality of sweetness is superior.

The intensity of sweetness is to be evaluated by sensory testing, with that of sugar being taken as 100. The results of sweetness intensity evaluation of typical sugar alcohols in a sensory test are shown below.

| Sugar: | 100 |
|---|---|
| Reduced malt sugar syrup: | 75 |
| Reduced maltose: | 80 |
| Xylitol: | 100 |
| Reduced palatinose: | 50 |
| Erythritol: | 70 |
| Sorbitol: | 60 |

The quality of sweetness is a feel of taste closely related to flavor and is also evaluated in a sensory test.

Example 2

Test candies were prepared in the same manner as in Example 1 except that the formulation given in Table 1 was employed. The candies were subjected to evaluation for intensity of sweetness and quality of sweetness in the same manner as in Example 1. The evaluation results are also shown in Table 1.

Comparative Examples 1 and 2

Test candies for comparison were prepared in the same manner as in Example 1 except that the formulations given in Table 1 were employed. The candies were subjected to evaluation for intensity of sweetness and quality of sweetness in the same manner as in Example 1. The evaluation results are also shown in Table 1.

Comparative Example 3

According to the formulation (each amount being in part(s) by mass) given in Table 1, sugar, malic acid, a flavoring agent (apple flavor) and a red colorant (purple corn color; trade name Sanred No. 5) were compounded, the resulting mixture was melted and mixed up at 100° C., and the melt was deposited into molds and then cooled for solidification. The thus-prepared test candies for comparison were evaluated for intensity of sweetness and quality of sweetness in the same manner as in Example 1. The evaluation results are also shown in Table 1.

TABLE 1

| Component/ingredient | Comparative example 1 | Example 1 | Example 2 | Comparative example 2 | Comparative example 3 |
|---|---|---|---|---|---|
| Reduced palatinose | 98.20 | 98.30 | 98.20 | 98.10 | — |
| Sugar | — | — | — | — | 98.90 |
| Malic acid | 0.50 | 0.50 | 0.50 | 0.50 | 0.50 |
| High sweetness intensity sweetener (acesulfam K) | 0.15 | 0.15 | 0.15 | 0.15 | — |
| High sweetness intensity sweetener (sucralose) | 0.050 | 0.050 | 0.050 | 0.050 | — |
| Flavoring agent (apple flavor) | 0.50 | 0.50 | 0.50 | 0.50 | 0.50 |
| Red colorant (Sanred No. 5) | 0.10 | 0.10 | 0.10 | 0.10 | 0.10 |
| (A) 1% Maltol | 0.10 | 0.10 | 0.30 | 0.40 | — |
| (B) 1% Furaneol | 0.30 | 0.20 | 0.10 | 0.10 | — |
| (C) 1% Cyclotene | 0.050 | 0.050 | 0.050 | 0.050 | — |
| (D) 1% Menthyl acetate | 0.050 | 0.050 | 0.050 | 0.050 | — |
| Total (parts by mass) | 100.0 | 100.0 | 100.0 | 100.0 | 100.0 |
| (A) + (B) + (C) + (D) (%) | 0.0050 | 0.0040 | 0.0050 | 0.0060 | — |
| (A)/(B) | 0.33 | 0.50 | 3 | 4 | — |
| (A)/[(B) + (C) + (D)] | 0.25 | 0.33 | 2 | 2 | — |
| High sweetness intensity sweetener content (%) | 0.20 | 0.20 | 0.20 | 0.20 | — |
| Intensity of sweetness | 10 | 0 | 0 | 1 | 0 |
| Quality of sweetness | 9 | 1 | 0 | 10 | 0 |

From Table 1, it is seen that the candies of Examples 1 and 2 are excellent in intensity of sweetness and quality of sweetness and are comparable in intensity of sweetness and quality of sweetness to sugar in Comparative Example 3.

It is seen, on the contrary, that the candies of Comparative Example 1 with a mass ratio (A)/(B) lower than the range specified herein are inferior in intensity of sweetness and quality of sweetness and that the candies of Comparative Example 2 with a mass ratio (A)/(B) in excess of the range specified herein are inferior in quality of sweetness.

Examples 3-5

Test candies were prepared in the same manner as in Example 1 except that the formulations given in Table 2 were employed. The candies were subjected to evaluation for intensity of sweetness and quality of sweetness in the same manner as in Example 1. The evaluation results are shown in Table 2.

Comparative Examples 4 and 5

Test candies for comparison were prepared in the same manner as in Example 1 except that the formulations given in Table 2 were employed. The candies were subjected to evaluation for intensity of sweetness and quality of sweetness in the same manner as in Example 1. The evaluation results are also shown in Table 2.

Comparative Example 6

According to the formulation (each amount being in part(s) by mass) given in Table 2, sugar, malic acid, a flavoring agent (apple flavor) and a red colorant (purple corn color; trade name Sanred No. 5) were compounded, the resulting mixture was melted and mixed up at 100° C., and the melt was deposited into molds and then cooled for solidification. The thus-prepared test candies for comparison were evaluated for intensity of sweetness and quality of sweetness in the same manner as in Example 1. The evaluation results are also shown in Table 2.

From Table 2, it is seen that the candies of Examples 3 to 5 are excellent in intensity of sweetness and quality of sweetness and are comparable in intensity of sweetness and quality of sweetness to sugar in Comparative Example 7.

It is seen, on the contrary, that the candies of Comparative Example 4 with a mass ratio (A)/[(B)+(C)+(D)] lower than the range specified herein are inferior in quality of sweetness and that the candies of Comparative Example 5 with a mass ratio (A)/[(B)+(C)+(D)] in excess of the range specified herein are inferior in intensity of sweetness and quality of sweetness.

Examples 6-9

According to the formulations (each amount being in part(s) by mass) given in Table 3, malic acid, a high sweetness intensity sweetener (acesulfam K; trade name Sunett), a high sweetness intensity sweetener (sucralose; trade name Sunsweet), a flavoring agent (apple flavor), a red colorant (purple corn color; trade name Sanred No. 5) and 1% (by mass) solutions of the respective flavoring components (A), (B), (C) and (D) in a glycerol fatty acid ester were incorporated into reduced palatinose. The resulting mixtures was melted and mixed up at 160° C. and the melt was deposited into molds and then cooled for solidification. The thus-prepared test candies were evaluated for intensity of sweetness and quality of sweetness in the same manner as in Example 1. The evaluation results are shown in Table 3.

Comparative Example 7

Test candies for comparison were prepared in the same manner as in Examples 6-9 except that the formulation given in Table 3 was employed. The candies were subjected to evaluation for intensity of sweetness and quality of sweetness. The evaluation results are also shown in Table 3.

Comparative Example 8

According to the formulation (each amount being in part(s) by mass) given in Table 3, sugar, malic acid, a flavoring agent (apple flavor) and a red colorant (purple corn color; trade

TABLE 2

| Component/ingredient | Comparative example 4 | Example 3 | Example 4 | Example 5 | Comparative example 5 | Comparative example 6 |
|---|---|---|---|---|---|---|
| Reduced palatinose | 98.00 | 98.20 | 98.30 | 98.10 | 98.20 | — |
| Sugar | — | — | — | — | — | 98.90 |
| Malic acid | 0.50 | 0.50 | 0.50 | 0.50 | 0.50 | 0.50 |
| High sweetness intensity sweetener (acesulfam K) | 0.15 | 0.15 | 0.15 | 0.15 | 0.15 | — |
| High sweetness intensity sweetener (sucralose) | 0.050 | 0.050 | 0.050 | 0.050 | 0.050 | — |
| Flavoring agent (apple flavor) | 0.50 | 0.50 | 0.50 | 0.50 | 0.50 | 0.50 |
| Red colorant (Sanred No. 5) | 0.10 | 0.10 | 0.10 | 0.10 | 0.10 | 0.10 |
| (A) 1% Maltol | 0.10 | 0.10 | 0.10 | 0.30 | 0.30 | — |
| (B) 1% Furaneol | 0.20 | 0.20 | 0.20 | 0.10 | 0.10 | — |
| (C) 1% Cyclotene | 0.20 | 0.10 | 0.050 | 0.10 | 0.050 | — |
| (D) 1% Menthyl acetate | 0.20 | 0.10 | 0.050 | 0.10 | 0.050 | — |
| Total (parts by mass) | 100.0 | 100.0 | 100.0 | 100.0 | 100.0 | 100.0 |
| (A) + (B) + (C) + (D) (%) | 0.0070 | 0.0050 | 0.0040 | 0.0060 | 0.0050 | — |
| (A)/(B) | 0.50 | 0.50 | 0.50 | 3 | 3 | — |
| (A)/[(B) + (C) + (D)] | 0.17 | 0.25 | 0.33 | 2 | 4 | — |
| High sweetness intensity sweetener content (%) | 0.20 | 0.20 | 0.20 | 0.20 | 0.20 | — |
| Intensity of sweetness | 0 | 0 | 1 | 2 | 9 | 0 |
| Quality of sweetness | 10 | 0 | 1 | 1 | 8 | 0 | name Sanred No. 5) were compounded, the resulting mixture was melted and mixed up at 100° C., and the melt was deposited into molds and then cooled for solidification. The thus-prepared test candies for comparison were evaluated for intensity of sweetness and quality of sweetness in the same manner as in Example 1. The evaluation results are also shown in Table 3.

TABLE 3

| Component/ingredient | Example 6 | Example 7 | Example 8 | Example 9 | Comparative example 7 | Comparative example 8 |
|---|---|---|---|---|---|---|
| Reduced palatinose | 98.65 | 98.45 | 98.20 | 97.70 | 97.20 | — |
| Sugar | — | — | — | — | — | 98.90 |
| Malic acid | 0.50 | 0.50 | 0.50 | 0.50 | 0.50 | 0.50 |
| High sweetness intensity sweetener (acesulfam K) | 0.15 | 0.15 | 0.15 | 0.15 | 0.15 | — |
| High sweetness intensity sweetener (sucralose) | 0.050 | 0.050 | 0.050 | 0.050 | 0.050 | — |
| Flavoring agent (apple flavor) | 0.50 | 0.50 | 0.50 | 0.50 | 0.50 | 0.50 |
| Red colorant (Sanred No. 5) | 0.10 | 0.10 | 0.10 | 0.10 | 0.10 | 0.10 |
| (A) 1% Maltol | 0.010 | 0.050 | 0.10 | 0.20 | 0.30 | — |
| (B) 1% Furaneol | 0.020 | 0.10 | 0.20 | 0.40 | 0.60 | — |
| (C) 1% Cyclotene | 0.010 | 0.050 | 0.10 | 0.20 | 0.30 | — |
| (D) 1% Menthyl acetate | 0.010 | 0.050 | 0.10 | 0.20 | 0.30 | — |
| Total (parts by mass) | 100.0 | 100.0 | 100.0 | 100.0 | 100.0 | 100.0 |
| (A) + (B) + (C) + (D) (%) | 0.00050 | 0.025 | 0.0050 | 0.010 | 0.015 | — |
| (A)/(B) | 0.50 | 0.50 | 0.50 | 0.50 | 0.50 | — |
| (A)/[(B) + (C) + (D)] | 0.25 | 0.25 | 0.25 | 0.25 | 0.25 | — |
| High sweetness intensity sweetener content (%) | 0.20 | 0.20 | 0.20 | 0.20 | 0.20 | — |
| Intensity of sweetness | 2 | 2 | 0 | 0 | 0 | 0 |
| Quality of sweetness | 0 | 0 | 0 | 1 | 10 | 0 |

From Table 3, it is seen that the candies of Examples 6 to 9 are excellent in intensity of sweetness and quality of sweetness and are comparable in intensity of sweetness and quality of sweetness to sugar in Comparative Example 8.

It is seen, on the contrary, that the candies of Comparative Example 7 with a content [(A)+(B)+(C)+(D)] in excess of the range specified herein are inferior in quality of sweetness.

Examples 10-13

Test candies were prepared in the same manner as in Examples 6-9 except that the formulations given in Table 4 were employed. The candies were subjected to evaluation for intensity of sweetness and quality of sweetness. The evaluation results are shown in Table 4.

Comparative Example 9

Test candies for comparison were prepared in the same manner as in Examples 10-13 except that the formulations given in Table 4 were employed. The candies were subjected to evaluation for intensity of sweetness and quality of sweetness in the same manner as in Examples 10-13. The evaluation results are also shown in Table 4.

Comparative Example 10

According to the formulation (each amount being in part(s) by mass) given in Table 4, sugar, malic acid, a flavoring agent (apple flavor) and a red colorant (purple corn color; trade name Sanred No. 5) were compounded, the resulting mixture was melted and mixed up at 100° C., and the melt was deposited into molds and then cooled for solidification. The thus-prepared test candies for comparison were evaluated for intensity of sweetness and quality of sweetness in the same manner as in Example 1. The evaluation results are also shown in Table 4.

TABLE 4

| Component/ingredient | Example 10 | Example 11 | Example 12 | Example 13 | Comparative example 9 | Comparative example 10 |
|---|---|---|---|---|---|---|
| Reduced palatinose | 98.35 | 98.25 | 98.10 | 97.90 | 97.65 | — |
| Sugar | — | — | — | — | — | 98.90 |
| Malic acid | 0.50 | 0.50 | 0.50 | 0.50 | 0.50 | 0.50 |
| High sweetness intensity sweetener (acesulfam K) | 0.010 | 0.030 | 0.060 | 0.10 | 0.15 | — |
| High sweetness intensity sweetener (sucralose) | 0.040 | 0.12 | 0.24 | 0.40 | 0.60 | — |
| Flavoring agent (apple flavor) | 0.50 | 0.50 | 0.50 | 0.50 | 0.50 | 0.50 |
| Red colorant (Sanred No. 5) | 0.10 | 0.10 | 0.10 | 0.10 | 0.10 | 0.10 |
| (A) 1% Maltol | 0.10 | 0.10 | 0.10 | 0.10 | 0.10 | — |
| (B) 1% Furaneol | 0.20 | 0.20 | 0.20 | 0.20 | 0.20 | — |
| (C) 1% Cyclotene | 0.10 | 0.10 | 0.10 | 0.10 | 0.10 | — |
| (D) 1% Menthyl acetate | 0.10 | 0.10 | 0.10 | 0.10 | 0.10 | — |
| Total (parts by mass) | 100.0 | 100.0 | 100.0 | 100.0 | 100.0 | 100.0 |
| (A) + (B) + (C) + (D)(%) | 0.0050 | 0.0050 | 0.0050 | 0.0050 | 0.0050 | — |
| (A)/(B) | 0.50 | 0.50 | 0.50 | 0.50 | 0.50 | — |
| (A)/[(B) + (C) + (D)] | 0.25 | 0.25 | 0.25 | 0.25 | 0.25 | — |

TABLE 4-continued

| Component/ingredient | Example 10 | Example 11 | Example 12 | Example 13 | Comparative example 9 | Comparative example 10 |
|---|---|---|---|---|---|---|
| High sweetness intensity sweetener content (%) | 0.050 | 0.15 | 0.30 | 0.50 | 0.75 | — |
| Intensity of sweetness | 2 | 1 | 0 | 0 | 0 | 0 |
| Quality of sweetness | 0 | 0 | 0 | 1 | 10 | 0 |

From Table 4, it is seen that the candies of Examples 10 to 13 are excellent in intensity of sweetness and quality of sweetness and are comparable in intensity of sweetness and quality of sweetness to sugar in Comparative Example 10.

It is seen, on the contrary, that the candies of Comparative Example 9 with a level of addition of the high sweetness intensity sweeteners (E) in excess of the range specified herein are inferior in quality of sweetness.

Example 14

According to the formulation (each amount being in part(s) by mass) given in Table 5, malic acid, a high sweetness intensity sweetener (acesulfam K; trade name Sunett), a high sweetness intensity sweetener (sucralose; trade name Sunsweet), a flavoring agent (apple flavor), a red colorant (purple corn color; trade name Sanred No. 5) and 1% (by mass) solutions of the respective flavoring components (A), (B), (C) and (D) in a glycerol fatty acid ester were incorporated into reduced palatinose. The resulting mixture was melted and mixed up at 160° C., and the melt was deposited into molds and then cooled for solidification. The thus-prepared test candies were evaluated for intensity of sweetness and quality of sweetness in the same manner as in Example 1. The evaluation results are shown in Table 5.

TABLE 5

| Component/ingredient | |
|---|---|
| Reduced palatinose | 98.28 |
| Malic acid | 0.50 |
| High sweetness intensity sweetener (acesulfam K) | 0.020 |
| High sweetness intensity sweetener (sucralose) | 0.10 |
| Flavoring agent (apple flavor) | 0.50 |
| Red colorant (Sanred No. 5) | 0.10 |
| (A) 1% Maltol | 0.20 |
| (B) 1% Furaneol | 0.10 |
| (C) 1% Cyclotene | 0.10 |
| (D) 1% Menthyl acetate | 0.10 |
| Total (parts by mass) | 100.0 |
| (A) + (B) + (C) + (D) (%) | 0.0050 |
| (A)/(B) | 2 |
| (A)/[(B) + (C) + (D)] | 0.67 |
| High sweetness intensity sweetener content (%) | 0.12 |
| Intensity of sweetness | 0 |
| Quality of sweetness | 0 |

From Table 5, it is seen that the candies of Example 14 are excellent in intensity of sweetness and quality of sweetness and are comparable in intensity of sweetness and quality of sweetness to sugar.

Example 15

According to the formulation (each amount being in part(s) by mass) given in Table 6, citric acid, vitamin C, a high sweetness intensity sweetener (acesulfam K; trade name Sunett), a high sweetness intensity sweetener (sucralose; trade name Sunsweet), a flavoring agent (apple flavor), a red colorant (purple corn color; trade name Sanred No. 5) and 1% (by mass) solutions of the respective flavoring components (A), (B), (C) and (D) in a glycerol fatty acid ester were incorporated into reduced palatinose. The resulting mixture was melted and mixed up at 160° C. and the melt was deposited into molds and then cooled for solidification. The thus-prepared test candies were evaluated for intensity of sweetness and quality of sweetness in the same manner as in Example 1. The evaluation results are shown in Table 6.

TABLE 6

| Component/ingredient | |
|---|---|
| Reduced palatinose | 96.07 |
| Citric acid | 2.0 |
| Vitamin C | 1.0 |
| High sweetness intensity sweetener (acesulfam K) | 0.030 |
| High sweetness intensity sweetener (sucralose) | 0.050 |
| Flavoring agent (apple flavor) | 0.50 |
| Red colorant (Sanred No. 5) | 0.10 |
| (A) 1% Maltol | 0.10 |
| (B) 1% Furaneol | 0.090 |
| (C) 1% Cyclotene | 0.030 |
| (D) 1% Menthyl acetate | 0.030 |
| Total (parts by mass) | 100.0 |
| (A) + (B) + (C) + (D) (%) | 0.0025 |
| (A)/(B) | 1.1 |
| (A)/[(B) + (C) + (D)] | 0.67 |
| High sweetness intensity sweetener content (%) | 0.080 |
| Intensity of sweetness | 0 |
| Quality of sweetness | 0 |

From Table 6, it is seen that the candies of Examples 15 are excellent in intensity of sweetness and quality of sweetness and are comparable in intensity of sweetness and quality of sweetness to sugar.

Example 16

A first layer candy composition was prepared by incorporating, according to the formulation (each amount being in part(s) by mass) given in Table 7, citric acid, vitamin C, a high sweetness intensity sweetener (acesulfam K; trade name Sunett), a high sweetness intensity sweetener (sucralose; trade name Sunsweet), a flavoring agent (acerola flavor), a red colorant (purple corn color; trade name Sanred No. 5) and 1% (by mass) solutions of the respective flavoring components (A), (B), and (C) in a glycerol fatty acid ester into reduced palatinose.

A second layer candy composition was prepared by incorporating, according to the formulation (each amount being in part(s) by mass) given in Table 7, a high sweetness intensity sweetener (acesulfam K; trade name Sunett), a high sweetness intensity sweetener (sucralose; trade name Sunsweet), a flavoring agent (lemon flavor), a yellow colorant (gardenia yellow color; trade name Gardenia Yellow AY) and 1% (by mass) solutions of the respective flavoring components (A), (B), (C) and (D) in a glycerol fatty acid ester into reduced palatinose.

The first layer candy composition was melted and mixed up at 160° C. and the melt was deposited into molds. Then, the second layer candy composition was melted and mixed up at 160° C. and the melt was deposited on each first layer. After cooling for solidification, test stacked candies were obtained.

The stacked candies were evaluated for intensity of sweetness and quality of sweetness in the same manner as in Example 1. The evaluation results are shown in Table 7.

TABLE 7

| Component/ingredient | First layer | Second layer |
| --- | --- | --- |
| Reduced palatinose | 89.27 | 99.46 |
| Citric acid | 4.0 | — |
| Vitamin C | 6.0 | — |
| High sweetness intensity sweetener (acesulfam K) | 0.10 | 0.10 |
| High sweetness intensity sweetener (sucralose) | 0.050 | 0.050 |
| Flavoring agent (acerola flavor) | 0.20 | — |
| Flavoring agent (lemon flavor) | — | 0.20 |
| Red colorant (Sanred No. 5) | 0.30 | — |
| Yellow colorant (Gardenia Yellow AY) | — | 0.10 |
| (A) 1% Maltol | 0.040 | 0.040 |
| (B) 1% Furaneol | 0.030 | 0.030 |
| (C) 1% Cyclotene | 0.010 | 0.010 |
| (D) 1% Menthyl acetate | — | 0.010 |
| Total (parts by mass) | 100.0 | 100.0 |
| (A) + (B) + (C) + (D) (%) | 0.00080 | 0.00090 |
| (A)/(B) | 1.3 | 1.3 |
| (A)/[(B) + (C) + (D)] | 1.0 | 0.8 |
| High sweetness intensity sweetener content (%) | 0.15 | 0.15 |
| Intensity of sweetness | 0 | |
| Quality of sweetness | 0 | |

From Table 7, it is seen that the stacked candies of Examples 16 are excellent in intensity of sweetness and quality of sweetness and are comparable in intensity of sweetness and quality of sweetness to sugar.

In addition, the different intensities of sweetness and qualities of sweetness of the two layers different in composition but comparable to those of sugar could be tasted and the candies were thus delicious.

Example 17

A first layer candy composition was prepared by incorporating, according to the formulation (each amount being in part(s) by mass) given in Table 8, vitamin C, malic acid, a high sweetness intensity sweetener (acesulfam K; trade name Sunett), a high sweetness intensity sweetener (sucralose; trade name Sunsweet), a flavoring agent (muscat flavor), a green colorant (safflower yellow color/gardenia blue color; trade name Melon C) and 1% (by mass) solutions of the respective flavoring components (A), (B), (C) and (D) in a glycerol fatty acid ester into reduced palatinose.

A second layer candy composition was prepared by compounding, according to the formulation (each amount being in part(s) by mass) given in Table 8, xylitol, sorbitol, vitamin C, malic acid, a flavoring agent (muscat flavor) and a green colorant (gardenia yellow/blue color; trade name Wasabi Color).

The first layer candy composition was melted and mixed up at 160° C. and the melt was deposited into molds. Then, the second layer candy composition was melted and mixed up at 120° C., and the melt was caused to crystallize by lowering the temperature and then deposited on each first layer. After cooling for solidification, test stacked candies were obtained.

The stacked candies were evaluated for intensity of sweetness and quality of sweetness in the same manner as in Example 1. The evaluation results are shown in Table 8.

TABLE 8

| Component/ingredient | First layer | Second layer |
| --- | --- | --- |
| Reduced palatinose | 48.0 | — |
| Xylitol | — | 43.0 |
| Sorbitol | — | 4.65 |
| Vitamin C | 0.50 | 0.50 |
| Malic acid | 1.0 | 1.50 |
| High sweetness intensity sweetener (acesulfam K) | 0.030 | — |
| High sweetness intensity sweetener (sucralose) | 0.020 | — |
| Flavoring agent (muscat flavor) | 0.30 | 0.20 |
| Melon Color C | 0.050 | — |
| Wasabi Color | — | 0.15 |
| (A) 1% Maltol | 0.030 | — |
| (B) 1% Furaneol | 0.010 | — |
| (C) 1% Cyclotene | 0.050 | — |
| (D) 1% Menthyl acetate | 0.010 | — |
| Total (parts by mass) | 50.0 | 50.0 |
| (A) + (B) + (C) + (D) (%) | 0.0020 | — |
| (A)/(B) | 3 | — |
| (A)/[(B) + (C) + (D)] | 0.42 | — |
| High sweetness intensity sweetener content (%) | 0.10 | — |
| Intensity of sweetness | 0 | |
| Quality of sweetness | 0 | |

Note:
The solvent used for each flavoring component (flavor) was a glycerol fatty acid ester.

From Table 8, it is seen that the stacked candies of Examples 17 are excellent in intensity of sweetness and quality of sweetness and are comparable in intensity of sweetness and quality of sweetness to sugar.

When sucked within the oral cavity, the candies gave a remarkable feeling of coolness owing to the endothermic action produced upon melting of the xylitol-containing layer and, in addition, the delicious taste of the deliciously sweet candy composition layer being stacked could be given simultaneously; the candies were thus delicious.

Example 18

A first layer candy composition was prepared by incorporating, according to the formulation (each amount being in part(s) by mass) given in Table 9, a vegetable oil, an emulsifier, a high sweetness intensity sweetener (acesulfam K; trade name Sunett), a high sweetness intensity sweetener (sucralose; trade name Sunsweet), a flavoring agent (milk flavor), and 1% (by mass) solutions of the respective flavoring components (A), (B) and (C) in a glycerol fatty acid ester into reduced palatinose.

A second layer candy composition was prepared by compounding, according to the formulation (each amount being in part(s) by mass) given in Table 9, xylitol and sorbitol.

A third layer candy composition was prepared in the same manner as in preparing the first layer candy composition by incorporating, according to the formulation (each amount being in part(s) by mass) given in Table 9, a vegetable oil, an emulsifier, a high sweetness intensity sweetener (acesulfam K; trade name Sunett), a high sweetness intensity sweetener (sucralose; trade name Sunsweet), a flavoring agent (milk flavor), and 1% (by mass) solutions of the respective flavoring components (A), (B) and (C) in a glycerol fatty acid ester into reduced palatinose.

The first layer candy composition was melted and mixed up at 160° C. and the melt was deposited into molds. Then, the second layer candy composition was melted and mixed up at 120° C. and the melt was caused to crystallize by lowering the temperature and then deposited on each first layer. Then, the third layer candy composition was melted and mixed up at 160° C. and the melt was deposited on each second layer. After cooling for solidification, test stacked candies having a three-layer structure were obtained.

The candies were evaluated for intensity of sweetness and quality of sweetness in the same manner as in Example 1. The evaluation results are shown in Table 9.

TABLE 9

| Component/ingredient | First layer | Second layer | Third layer |
|---|---|---|---|
| Reduced palatinose | 49.22 | — | 49.22 |
| Xylitol | — | 27.0 | — |
| Sorbitol | — | 3.0 | — |
| Vegetable fat/oil | 0.20 | — | 0.20 |
| Emulsifier | 0.10 | — | 0.10 |
| High sweetness intensity sweetener (acesulfam K) | 0.020 | — | 0.020 |
| High sweetness intensity sweetener (sucralose) | 0.020 | — | 0.020 |
| Flavoring agent (milk flavor) | 0.40 | — | 0.40 |
| (A) 1% Maltol | 0.020 | — | 0.020 |
| (B) 1% Furaneol | 0.015 | — | 0.015 |
| (C) 1% Cyclotene | 0.0050 | — | 0.0050 |
| (D) 1% Menthyl acetate | — | — | — |
| Total (parts by mass) | 50.0 | 30.0 | 50.0 |
| (A) + (B) + (C) + (D) (%) | 0.00080 | — | 0.00080 |
| (A)/(B) | 1.3 | — | 1.3 |
| (A)/[(B) + (C) + (D)] | 1 | — | 1 |
| High sweetness intensity sweetener content (%) | 0.080 | — | 0.080 |
| Intensity of sweetness | | 0 | |
| Quality of sweetness | | 0 | |

Note:
The solvent used for each flavoring component (flavor) was a glycerol fatty acid ester.

From Table 9, it is seen that the stacked candies of Examples 18 are excellent in intensity of sweetness and quality of sweetness and are comparable in intensity of sweetness and quality of sweetness to sugar.

When sucked within the oral cavity, the candies gave a remarkable feeling of coolness owing to the endothermic action produced upon melting of the xylitol-containing layer and, in addition, the delicious taste of each of the deliciously sweet candy composition layers being stacked could be given simultaneously or the delicious taste changed with the lapse of time, for example different texture feels are given at the beginning of sucking and toward the end of sucking; the candies were thus delicious.

Industrial Applicability

The deliciously sweet candy composition according to the invention, which comprises sugar alcohol as a main raw material and comprises sweetener component (E) high in intensity of sweetness, the above-mentioned flavoring components (A) and (B) as essential components, each in an effective amount, and an effective amount of at least one component selected from among the flavoring components (C) and (D), produces remarkable effects: even when used in manufacturing sugarless candies, it can avoid the prior art watery or weak taste problem, among others; the taste thereof has a natural sweetness and is comparable to the taste of the conventional sugar-based candies; while, in the art, there is the problem that when attempts are made to compensate for the shortage of intensity of sweetness of reduced palatinose by incorporating therein a sweetener high in intensity of sweetness, the taste of the resulting compositions become no longer a natural one, the candy composition of the invention, even when reduced palatinose is a main raw material, can reliably show improvements in intensity of sweetness and quality of sweetness so as to be comparable to sugar; the use of palatinose, which has high crystallinity and not so hygroscopic as reduced starch syrup or reduced malt sugar syrup, produces marked effects, for example it will not become sticky even when left in a humid room. Thus, the invention is highly valuable from the industrial application viewpoint.

The invention claimed is:

1. A deliciously sweet candy composition, said composition comprising a sugar alcohol as a main raw material and further comprising high intensity sweetener component (E) and flavoring components (A) and (B) specified below respectively as essential components, each in an effective amount, and an effective amount of at least flavoring component (D) defined below:
    flavoring components:
        (A) maltol;
        (B) furaneol;
        (C) cyclotene;
        (D) menthyl acetate;
    wherein component (E) is present in an amount of 0.05-0.50% by mass based on the whole candy composition; wherein components (A) and (B) and at least (D) are present in a total proportion [(A)+(B)+(C)+(D)] of 0.0005-0.01% by mass based on the whole candy composition; and wherein the mass ratio (A)/(B) is within the range specified by Formula (1) below and the mass ratio (A)/[(B)+(C)+(D)] is within the range specified by Formula (2) below:

$$0.5 \leq (A)/(B) < 2 \quad \text{Formula (1)};$$

$$0.25 \leq (A)/[(B)+(C)+(D)] \leq 2 \quad \text{Formula (2)},$$

wherein furaneol is present in an amount of 0.001 to 0.004 wt %.

2. A candy composition according to claim 1, wherein the high intensity sweetener component (E) is selected from the group consisting of acesulfam K, stevia and sucralose.

3. A candy composition according to claim 1, wherein the sugar alcohol consists essentially of reduced palatinose.

4. A candy composed of the candy composition according to claim 1.

5. A candy having a composite structure comprising a combination of two or more different candy compositions each according to claim 1.

6. A candy having a composite structure comprising a combination of a xylitol-containing layer containing xylitol as a main component but containing none of said components (A) to (E) of claim 1 with a candy composition according to claim 1.

7. A laminated candy having a three-layer lamination structure comprising a xylitol-containing layer containing xylitol as a main component but containing none of said components (A) to (E) of claim 1 sandwiched between two candy composition layers formed of two respective candy compositions, either the same or different in composition, according to claim 1.

8. A candy composition according to claim 1, wherein maltol is present in an amount of 0.001 to 0.003 wt % and either cyclotene or menthyl acetate, both of which are present, is present in an amount of 0.0005 to 0.002 wt %.

9. A candy composition according to claim 8, wherein the high intensity sweetener component (E) is selected from the group consisting of acesulfam K, stevia and sucralose.

10. A candy composition according claim 8, wherein the sugar alcohol consists essentially of reduced palatinose.

11. A candy composed of the candy composition according to claim 8.

12. A candy having a composite structure comprising a combination of two or more different candy compositions each according to claim 8.

13. A candy having a composite structure comprising a combination of a xylitol-containing layer containing xylitol as a main component but containing none of said components (A) to (E) with a candy composition according to claim 8.

14. A laminated candy having a three-layer lamination structure comprising a xylitol-containing layer containing xylitol as a main component but containing none of said components (A) to (E) as sandwiched between two candy composition layers formed of two respective candy compositions same or different in composition according to claim 8.

15. A deliciously sweet candy composition, said composition comprising:
    a sugar alcohol as a main raw material;
    a high intensity sweetener component;
    flavoring components maltol, furaneol and menthyl acetate as essential components, each in an effective amount; and
    the sweetener component being present in an amount of 0.05-0.50% by mass based on the whole candy composition.

* * * * *